US009826237B2

(12) United States Patent
Rodriguez et al.

(10) Patent No.: US 9,826,237 B2
(45) Date of Patent: *Nov. 21, 2017

(54) ANALYTICS ASSISTED ENCODING (71) Applicant: Intel Corporation, Santa Clara, CA (US)

(72) Inventors: Jose M. Rodriguez, San Jose, CA (US); Animesh Mishra, Pleasanton, CA (US); Naveen Doddapuneni, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,224

(22) Filed: Nov. 14, 2016

(65) Prior Publication Data

US 2017/0078670 A1   Mar. 16, 2017

Related U.S. Application Data

(63) Continuation of application No. 15/236,641, filed on Aug. 15, 2016, which is a continuation of application
(Continued)

(51) Int. Cl.
*G06K 9/36* (2006.01)
*H04N 19/139* (2014.01)
(Continued)

(52) U.S. Cl.
CPC ....... *H04N 19/139* (2014.11); *G06K 9/00771* (2013.01); *G06T 9/00* (2013.01);
(Continued)

(58) Field of Classification Search
CPC ...... H04N 19/134; H04N 19/90; H04N 19/51; H04N 19/176; H04N 19/172; H04N 19/46;
(Continued)

(56) References Cited

U.S. PATENT DOCUMENTS 4,951,140 A   8/1990  Ueno et al.
5,367,334 A   11/1994 Nishino et al.
(Continued)

FOREIGN PATENT DOCUMENTS

CN   103765888 A   4/2014
EP   0720385 A2    7/1996
(Continued)

OTHER PUBLICATIONS

Chuang, "A 59.5mW Scalable/Multi-View Video Decoder Chip for Quad/3D Full HDTV and Video Streaming Application," 2010 IEEE International Solid-State Circuit Conference, Feb. 7-11, 2010, pp. 300-331.
(Continued)

*Primary Examiner* — Amir Alavi
(74) *Attorney, Agent, or Firm* — Trop Pruner & Hu, P.C.

(57) ABSTRACT

Video analytics may be used to assist video encoding by selectively encoding only portions of a frame and using, instead, previously encoded portions. Previously encoded portions may be used when succeeding frames have a level of motion less than a threshold. In such case, all or part of succeeding frames may not be encoded, increasing bandwidth and speed in some embodiments.

28 Claims, 5 Drawing Sheets

Related U.S. Application Data

No. 14/658,513, filed on Mar. 16, 2015, now Pat. No. 9,438,916, which is a continuation of application No. 13/994,876, filed as application No. PCT/US2011/050513 on Sep. 6, 2011, now Pat. No. 9,014,493.

(51) Int. Cl.

| | | |
|---|---|---|
| *G06K 9/00* | (2006.01) | |
| *G06T 9/00* | (2006.01) | |
| *H04N 19/172* | (2014.01) | |
| *H04N 19/132* | (2014.01) | |
| *H04N 19/137* | (2014.01) | |
| *H04N 19/17* | (2014.01) | |
| *H04N 19/134* | (2014.01) | |
| *H04N 19/51* | (2014.01) | |
| *H04N 19/90* | (2014.01) | |
| *H04N 19/176* | (2014.01) | |
| *H04N 19/46* | (2014.01) | |
| *H04N 19/156* | (2014.01) | |
| *H04N 19/162* | (2014.01) | |

(52) U.S. Cl.
CPC ......... *H04N 19/132* (2014.11); *H04N 19/134* (2014.11); *H04N 19/137* (2014.11); *H04N 19/17* (2014.11); *H04N 19/172* (2014.11); *H04N 19/51* (2014.11); *H04N 19/90* (2014.11); *H04N 19/156* (2014.11); *H04N 19/162* (2014.11); *H04N 19/176* (2014.11); *H04N 19/46* (2014.11)

(58) Field of Classification Search
CPC .. H04N 19/132; H04N 19/137; H04N 19/156; H04N 19/162; H04N 19/17; H04N 19/139; G06T 9/00; G06K 9/00771
See application file for complete search history.

(56) References Cited

U.S. PATENT DOCUMENTS

| | | | |
|---|---|---|---|
| 5,896,176 A | 4/1999 | Das et al. | |
| 7,016,414 B2* | 3/2006 | Chen | H04N 19/139 |
| | | | 375/240.13 |
| 9,014,493 B2* | 4/2015 | Rodriguez | G06K 9/00771 |
| | | | 382/232 |
| 9,179,156 B2* | 11/2015 | Mishra | H04N 19/132 |
| 9,438,916 B2* | 9/2016 | Rodriguez | G06K 9/00771 |
| 2003/0147462 A1 | 8/2003 | Maeda | |
| 2005/0169367 A1 | 8/2005 | Venetianer et al. | |
| 2006/0120458 A1 | 6/2006 | Kodama et al. | |
| 2007/0064800 A1 | 3/2007 | Ha | |
| 2007/0076796 A1 | 4/2007 | Shi et al. | |
| 2012/0155536 A1* | 6/2012 | Pace | G06T 9/001 |
| | | | 375/240.08 |
| 2013/0120419 A1* | 5/2013 | Mishra | H04N 19/132 |
| | | | 345/531 |
| 2013/0272620 A1* | 10/2013 | Rodriguez | G06K 9/00771 |
| | | | 382/232 |
| 2013/0278775 A1* | 10/2013 | Doddapuneni | H04N 19/00903 |
| | | | 348/159 |
| 2013/0322551 A1* | 12/2013 | Rodriguez | G06F 13/28 |
| | | | 375/240.26 |
| 2013/0322552 A1* | 12/2013 | Mishra | H04N 19/00 |
| | | | 375/240.26 |
| 2013/0329137 A1* | 12/2013 | Mishra | H04N 5/91 |
| | | | 348/714 |
| 2014/0146067 A1 | 5/2014 | Doddapuneni | |
| 2014/0294102 A1 | 10/2014 | Doddapuneni | |
| 2015/0189285 A1 | 7/2015 | Rodriguez | |
| 2014/0040570 A1 | 2/2016 | Rodriguez | |
| 2017/0078670 A1* | 3/2017 | Rodriguez | H04N 19/139 |

FOREIGN PATENT DOCUMENTS

| | | |
|---|---|---|
| JP | 06133299 | 5/1994 |
| JP | 2002135721 | 5/2002 |
| TW | 1551149 B | 9/2016 |
| WO | 03034745 A2 | 4/2003 |

OTHER PUBLICATIONS

TW office action issued in corresponding TW application No. 101132342 dated May 11, 2015.
TW office action issued in corresponding TW application No. 101132342 dated Mar. 21, 2016.
CN office action issued in corresponding CN application No. 201180073281.8 dated May 5, 2016.
EP Supplementary EP Search report issued in corresponding EP application No. 11871955 dated Mar. 30, 2015 (7 pages).
EP office action issued in corresponding EP application No. 11871955 dated Dec. 6, 2016 (5 pages).
CN Office action issued in corresponding CN application No. 103765888 dated Jan. 4, 2017 (5 pages).
PCT search report and written opinion issued in corresponding PCT/US2011/050513 dated Apr. 10, 2012 (8 pages).
CN office action issued in corresponding CN application No. 201180073281.8 dated Apr. 27, 2017 (16 pages).

* cited by examiner

ANALYTICS ASSISTED ENCODING

CROSS-REFERENCE TO RELATED APPLICATIONS

This application is a continuation of U.S. application Ser. No. 15/236,641 filed on Aug. 15, 2016, which is a continuation of U.S. patent application Ser. No. 14/658,513 filed on Mar. 16, 2016, which is a continuation of U.S. patent application Ser. No. 13/994,876, filed on Jun. 17, 2013, which is a 371 of PCT/US2011/50513, filed on Sep. 6, 2011.

BACKGROUND

This relates generally to computers and, particularly, to video processing.

There are a number of applications in which video must be processed and/or stored. One example is video surveillance, wherein one or more video feeds may be received, analyzed, and processed for security or other purposes. Another conventional application is for video conferencing.

Typically, general purpose processors, such as central processing units, are used for video processing. In some cases, a specialty processor, called a graphics processor, may assist the central processing unit.

Video analytics involves obtaining information about the content of video information. For example, the video processing may include content analysis, wherein the content video is analyzed in order to detect certain events or occurrences or to find information of interest.

Conventionally, memories that are used in connection with video processing are linear memories. By linear memories, it is intended to refer to the characteristic of conventional memories wherein the memory is broken up into rows and columns. Individual addresses at an intersection of a row or column may be addressed in what might be referred to as point addressing. In addition, linearly addressed portions along a row, or perhaps even a column, may be addressed by providing an initial address and a delimiter of the extent of the addressed memory locations. Thus, conventionally, when addressing a memory, one or more locations along only a single addressed line, be it a row or a column, can be addressed at any given time or in one memory access operation.

DETAILED DESCRIPTION

In accordance with some embodiments, instead of only using linear addressing, two dimensional matrix addressing may be provided as well. In two dimensional or matrix addressing, a point location in a memory may be specified and a matrix size may be provided. The size may be specified as a dimension for the memory matrix being addressed or by providing an extent in row and column directions of the addressed region. As a result, a two dimensional block or matrix of memory may be accessed, either for reading or writing, at one time.

In some embodiments, the ability to access a matrix of two dimensional locations at one time can expedite memory access operations since the addressing may effectively be automated. Only the first address may be needed, in some embodiments, and the rest of the addresses may be generated automatically. In addition, the bandwidth of some transfers may be reduced in some embodiments.

In embodiments involving video analytics, video analytics assisted encoding may be used. The portion of any given frame or frames that are encoded may be determined on a case-by-case basis using video analytics. Particularly, video analytics may be used to judge the amount of motion in one or more regions of one or more frames. Based on this information, encoding may or may not be done for an entire frame or may or may not be done for regions of a frame outside one or more regions that exhibit motion beyond a given threshold. Again, speed and bandwidth may be improved in some embodiments.

While an example of an embodiment is given in which video analytics are used, in some embodiments, video analytics are only optional and may or may not be used.

Figure 1:
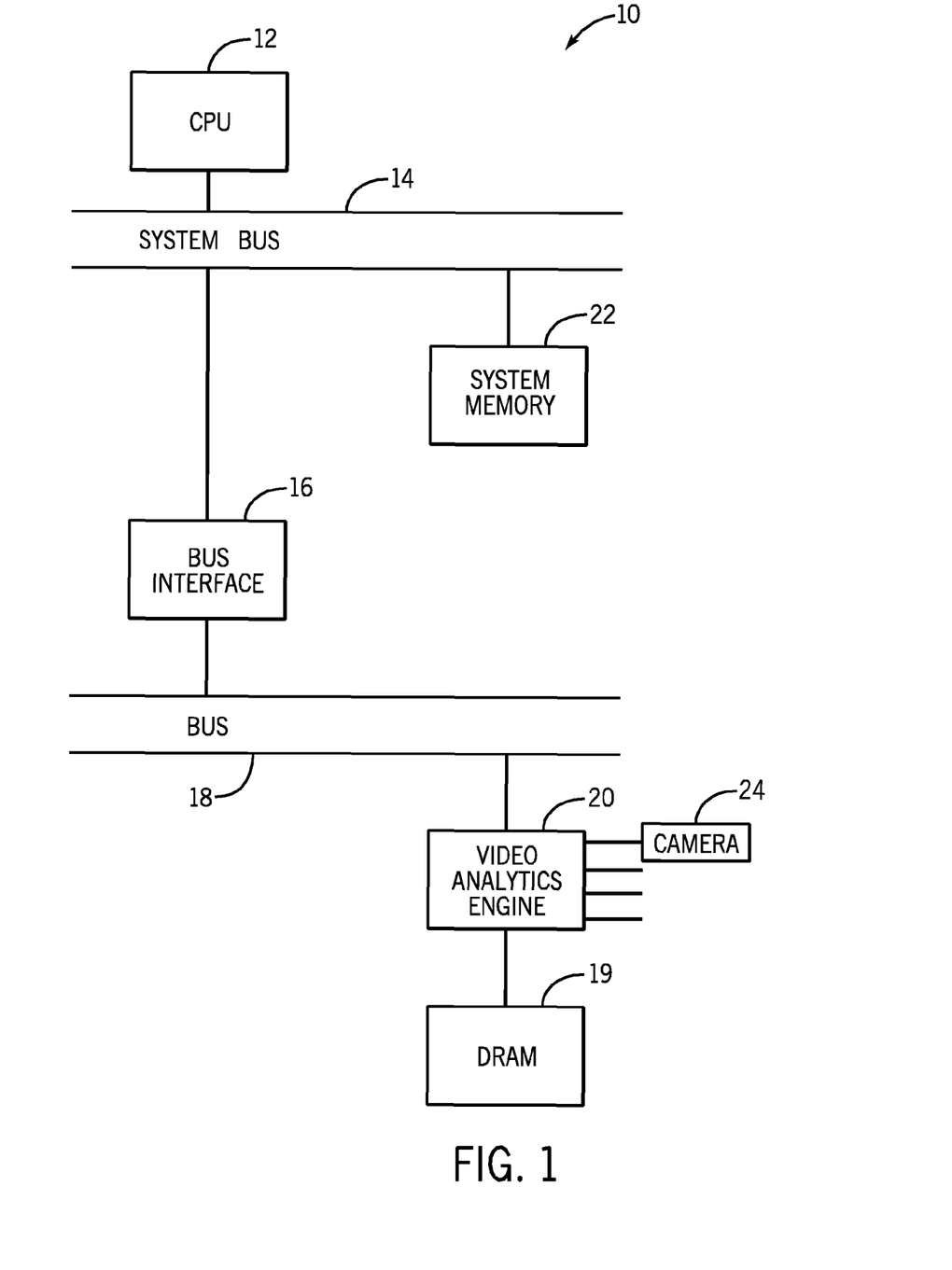
FIG. 1 is a system architecture in accordance with one embodiment of the present invention.

Referring to FIG. 1, a computer system 10 may be any of a variety of computer systems, including those that use video analytics, such as video surveillance and video conferencing application, as well as embodiments which do not use video analytics. The system 10 may be a desk top computer, a server, a laptop computer, a mobile Internet device, or a cellular telephone, to mention a few examples.

The system 10 may have one or more host central processing units 12, coupled to a system bus 14. A system memory 22 may be coupled to the system bus 14. While an example of a host system architecture is provided, the present invention is in no way limited to any particular system architecture.

The system bus 14 may be coupled to a bus interface 16, in turn, coupled to a conventional bus 18. In one embodiment, the Peripheral Component Interconnect Express (PCIe) bus may be used, but the present invention is in no way limited to any particular bus.

A video analytics engine 20 may be coupled to the host via a bus 18. In one embodiment, the video analytics engine may be a single integrated circuit which provides both encoding and video analytics. In one embodiment, the integrated circuit may use embedded Dynamic Random Access Memory (EDRAM) technology. However, in some embodiments, either encoding or video analytics may be dispensed with. In addition, in some embodiments, the engine 20 may include a memory controller that controls an onboard integrated two dimensional matrix memory, as well as providing communications with an external memory.

Thus, in the embodiment illustrated in FIG. 1, the video analytics engine 20 communicates with a local dynamic random access memory (DRAM) 19. Specifically, the video analytics engine 20 may include a memory controller for accessing the memory 19. Alternatively, the engine 20 may use the system memory 22 and may include a direct connection to system memory.

Also coupled to the video analytics engine 20 may be one or more cameras 24. In some embodiments, up to four simultaneous video inputs may be received in standard definition format. In some embodiments, one high definition input may be provided on three inputs and one standard definition may be provided on the fourth input. In other embodiments, more or less high definition inputs may be provided and more or less standard definition inputs may be provided. As one example, each of three inputs may receive ten bits of high definition input data, such as R, G and B inputs or Y, U and V inputs, each on a separate ten bit input line.

Figure 2:
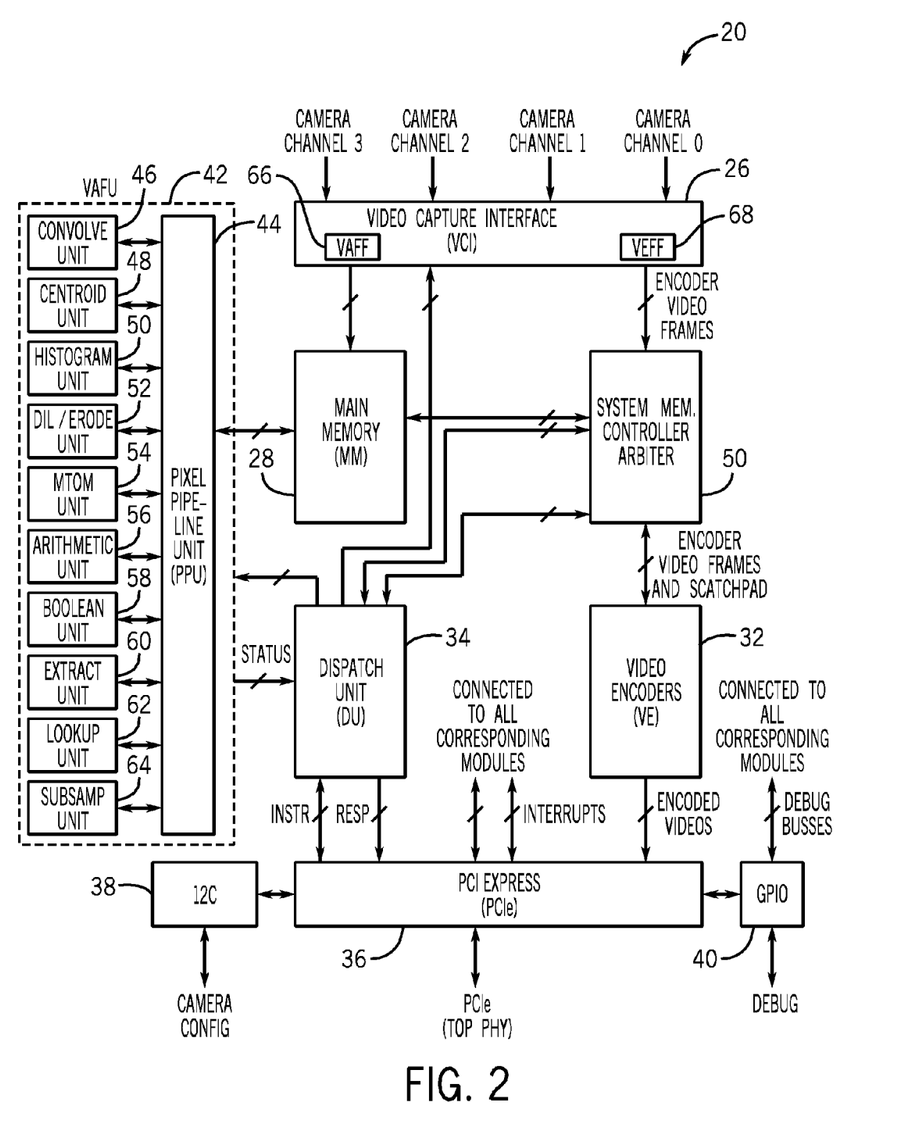
FIG. 2 is a circuit depiction for the video analytics engine shown in FIG. 1 in accordance with one embodiment.

One embodiment of the video analytics engine 20, shown in FIG. 2, is depicted in an embodiment with four camera channel inputs at the top of the page. The four inputs may be received by a video capture interface 26. The video capture interface 26 may receive multiple simultaneous video inputs in the form of camera inputs or other video information, including television, digital video recorder, or media player inputs, to mention a few examples.

The video capture interface automatically captures and copies each input frame. One copy of the input frame is provided to the VAFF unit 66 and the other copy may be provided to VEFF unit 68. The VEFF unit 68 is responsible for storing the video on the external memory, such as the memory 22, shown in FIG. 1. The external memory may be coupled to an on-chip system memory controller/arbiter 50 in one embodiment. In some embodiments, the storage on the external memory may be for purposes of video encoding. Specifically, if one copy is stored on the external memory, it can be accessed by the video encoders 32 for encoding the information in a desired format. In some embodiments, a plurality of formats are available and the system may select a particular encoding format that is most desirable.

As described above, in some cases, video analytics may be utilized to improve the efficiency of the encoding process implemented by the video encoders 32. Once the frames are encoded, they may be provided via the PCI Express bus 36 to the host system.

At the same time, the other copies of the input video frames are stored on the two dimensional matrix or main memory 28. The VAFF may process and transmit all four input video channels at the same time. The VAFF may include four replicated units to process and transmit the video. The transmission of video for the memory 28 may use multiplexing. Due to the delay inherent in the video retrace time, the transfers of multiple channels can be done in real time, in some embodiments.

Storage on the main memory may be selectively implemented non-linearly or linearly. In conventional, linear addressing one or more locations on intersecting addressed lines are specified to access the memory locations. In some cases, an addressed line, such as a word or bitline, may be specified and an extent along that word or bitline may be indicated so that a portion of an addressed memory line may be successively stored in automated fashion.

In contrast, in two dimensional or non-linear addressing, both row and column lines may be accessed in one operation. The operation may specify an initial point within the memory matrix, for example, at an intersection of two addressed lines, such as row or column lines. Then a memory size or other delimiter is provided to indicate the extent of the matrix in two dimensions, for example, along row and column lines. Once the initial point is specified, the entire matrix may be automatically stored by automated incrementing of addressable locations. In other words, it is not necessary to go back to the host or other devices to determine addresses for storing subsequent portions of the memory matrix, after the initial point. The two dimensional memory offloads the task of generating addresses or substantially entirely eliminates it. As a result, in some embodiments, both required bandwidth and access time may be reduced.

Basically the same operation may be done in reverse to read a two dimensional memory matrix. Alternatively, a two dimensional memory matrix may be accessed using conventional linear addressing as well.

While an example is given wherein the size of the memory matrix is specified, other delimiters may be provided as well, including an extent in each of two dimensions (i.e. along word and bitlines). The two dimensional memory is advantageous with still and moving pictures, graphs, and other applications with data in two dimensions.

Information can be stored in the memory 28 in two dimensions or in one dimension. Conversion between one and two dimensions can occur automatically on the fly in hardware, in one embodiment.

Figure 3:
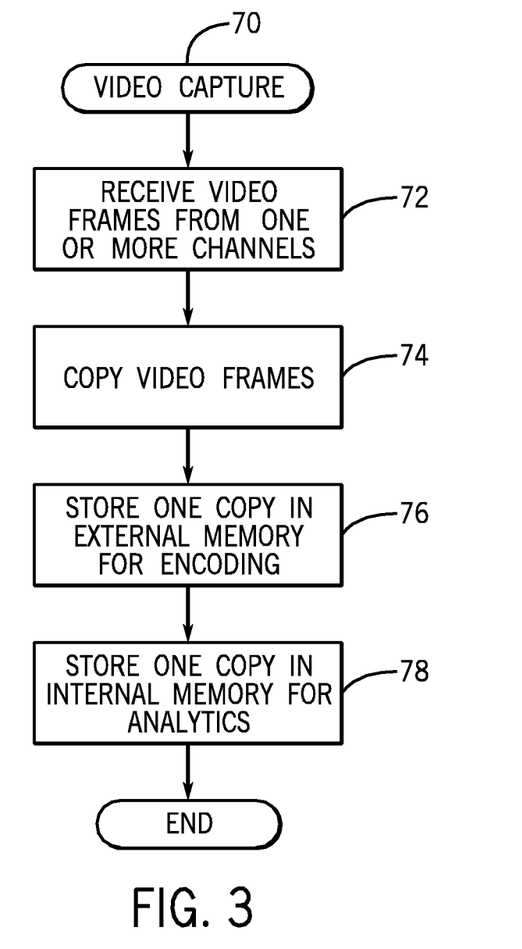
FIG. 3 is a flow chart for video capture in accordance with one embodiment of the present invention.

Thus, referring to FIG. 3, a system for video capture 20 may be implemented in hardware, software, and/or firmware. Hardware embodiments may be advantageous, in some cases, because they may be capable of greater speeds.

As indicated in block 72, the video frames may be received from one or more channels. Then the video frames are copied, as indicated in block 74. Next, one copy of the video frames is stored in the external memory for encoding, as indicated in block 76. The other copy is stored in the internal or the main memory 28 for analytics purposes, as indicated in block 78.

Figure 4:
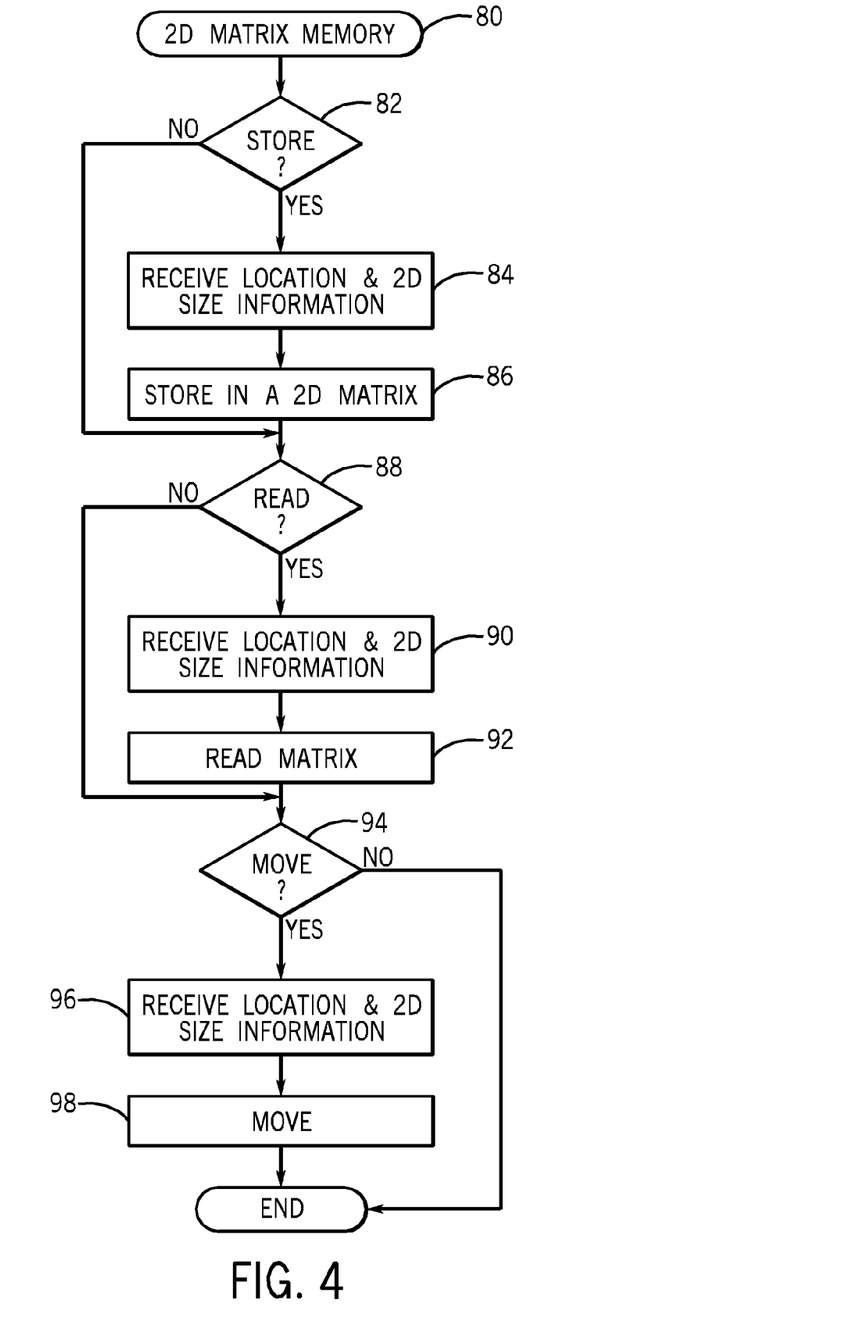
FIG. 4 is a flow chart for a two dimensional matrix memory in accordance with one embodiment.

Referring next to the two dimensional matrix sequence 80, shown in FIG. 4, a sequence may be implemented in software, firmware, or hardware. Again, there may be speed advantages in using hardware embodiments.

Initially, a check at diamond 82 determines whether a store command has been received. Conventionally, such commands may be received from the host system and, particularly, from its central processing unit 12. Those commands may be received by a dispatch unit 34, which then provides the commands to the appropriate units of the engine 20, used to implement the command. When the command has been implemented, in some embodiments, the dispatch unit reports back to the host system.

If a store command is involved, as determined in diamond 82, an initial memory location and two dimensional size information may be received, as indicated in block 84. Then the information is stored in an appropriate two dimensional matrix, as indicated in block 86. The initial location may, for example, define the upper left corner of the matrix. The store operation may automatically find a matrix within the memory 20 of the needed size in order to implement the operation. Once the initial point in the memory is provided, the operation may automatically store the succeeding parts of the matrix without requiring additional address computations, in some embodiments.

Conversely, if a read access is involved, as determined in diamond 88, the initial location and two dimensional size information is received, as indicated in block 90. Then the designated matrix is read, as indicated in block 92. Again, the access may be done in automated fashion, wherein the initial point may be accessed, as would be done in conventional linear addressing, and then the rest of the addresses are automatically determined without having to go back and compute addresses in the conventional fashion.

Finally, if a move command has been received from the host, as determined in block 94, the initial location and two dimensional size information is received, as indicated in block 96, and the move command is automatically implemented, as indicated in block 98. Again, the matrix of information may be automatically moved from one location to another, simply by specifying a starting location and providing size information.

Referring back to FIG. 2, the video analytics unit 42 may be coupled to the rest of the system through a pixel pipeline unit 44. The unit 44 may include a state machine that executes commands from the dispatch unit 34. Typically, these commands originate at the host and are implemented by the dispatch unit. A variety of different analytics units may be included based on application. In one embodiment, a convolve unit 46 may be included for automated provision of convolutions.

The convolve command may include both a command and arguments specifying a mask, reference or kernel so that a feature in one captured image can be compared to a reference two dimensional image in the memory 28. The command may include a destination specifying where to store the convolve result.

In some cases, each of the video analytics units may be a hardware accelerator. By "hardware accelerator," it is intended to refer to a hardware device that performs a function faster than software running on a central processing unit.

In one embodiment, each of the video analytics units may be a state machine that is executed by specialized hardware dedicated to the specific function of that unit. As a result, the units may execute in a relatively fast way. Moreover, only one clock cycle may be needed for each operation implemented by a video analytics unit because all that is necessary is to tell the hardware accelerator to perform the task and to provide the arguments for the task and then the sequence of operations may be implemented, without further control from any processor, including the host processor.

Other video analytics units, in some embodiments, may include a centroid unit 48 that calculates centroids in an automated fashion, a histogram unit 50 that determines histograms in automated fashion, and a dilate/erode unit 52.

The dilate/erode unit 52 may be responsible for either increasing or decreasing the resolution of a given image in automated fashion. Of course, it is not possible to increase the resolution unless the information is already available, but, in some cases, a frame received at a higher resolution may be processed at a lower resolution. As a result, the frame may be available in higher resolution and may be transformed to a higher resolution by the dilate/erode unit 52.

The Memory Transfer of Matrix (MTOM) unit 54 is responsible for implementing move instructions, as described previously. In some embodiments, an arithmetic unit 56 and a Boolean unit 58 may be provided. Even though these same units may be available in connection with a central processing unit or an already existent coprocessor, it may be advantageous to have them onboard the engine 20, since their presence on-chip may reduce the need for numerous data transfer operations from the engine 20 to the host and back. Moreover, by having them onboard the engine 20, the two dimensional or matrix main memory may be used in some embodiments.

An extract unit 60 may be provided to take vectors from an image. A lookup unit 62 may be used to lookup particular types of information to see if it is already stored. For example, the lookup unit may be used to find a histogram already stored. Finally, the subsample unit 64 is used when the image has too high a resolution for a particular task. The image may be subsampled to reduce its resolution.

In some embodiments, other components may also be provided including an I$_2$C interface 38 to interface with camera configuration commands and a general purpose input/output device 40 connected to all the corresponding modules to receive general inputs and outputs and for use in connection with debugging, in some embodiments.

Figure 5:
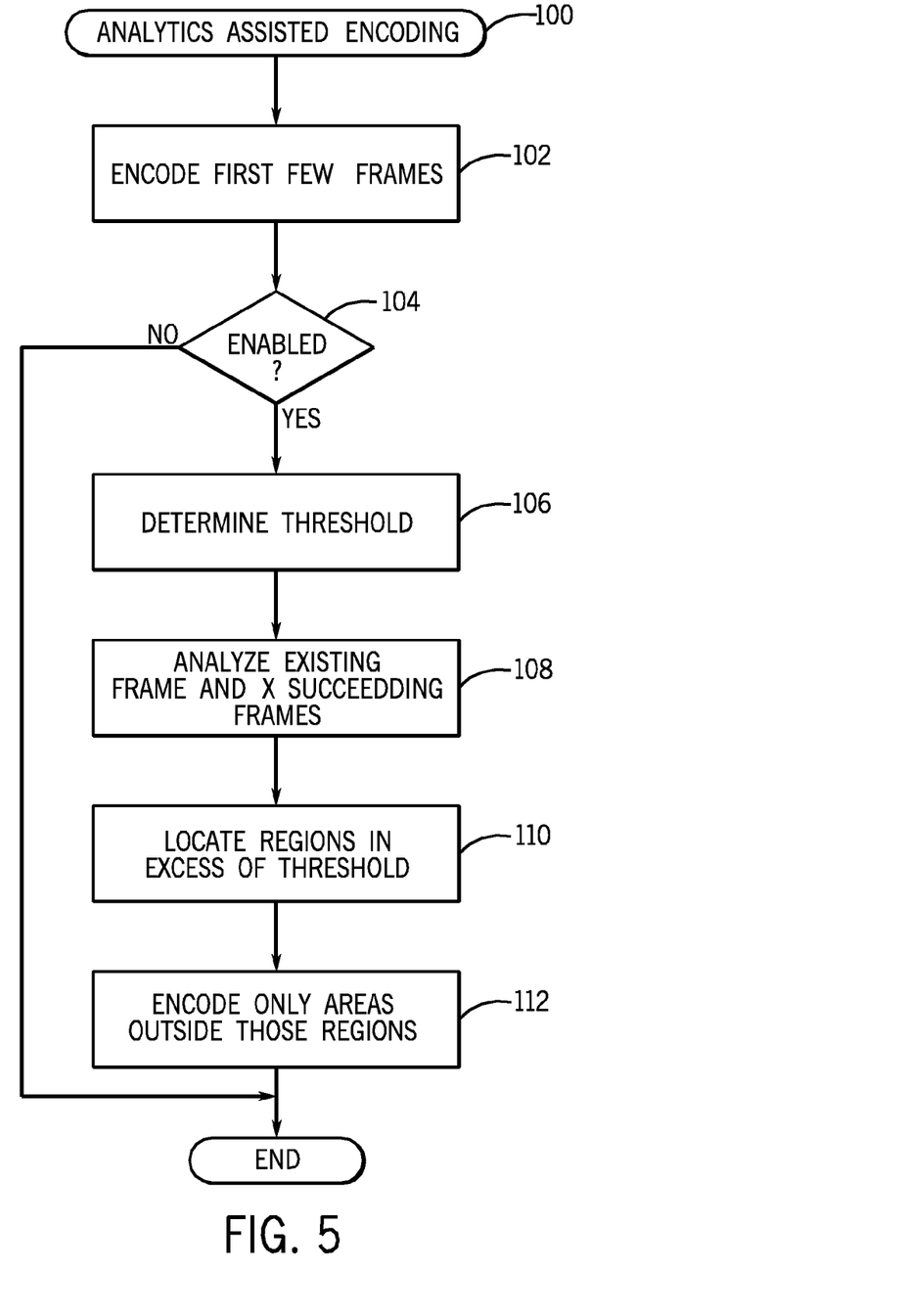
FIG. 5 is a flow chart for analytics assisted encoding in accordance with one embodiment.

Finally, referring to FIG. 5, an analytics assisted encoding scheme 100 may be implemented, in some embodiments. The scheme may be implemented in software, firmware and/or hardware. However, hardware embodiments may be faster. The analytics assisted encoding may use analytics capabilities to determine what portions of a given frame of video information, if any, should be encoded. As a result, some portions or frames may not need to be encoded in some embodiments and, as one result, speed and bandwidth may be increased.

In some embodiments, what is or is not encoded may be case specific and may be determined on the fly, for example, based on available battery power, user selections, and available bandwidth, to mention a few examples. More particularly, image or frame analysis may be done on existing frames versus ensuing frames to determine whether or not the entire frame needs to be encoded or whether only portions of the frame need to be encoded. This analytics assisted encoding is in contrast to conventional motion estimation based encoding which merely decides whether or not to include motion vectors, but still encodes each and every frame.

In some embodiments of the present invention, successive frames are either encoded or not encoded on a selective basis and selected regions within a frame, based on the extent of motion within those regions, may or may not be encoded at all. Then, the decoding system is told how many frames were or were not encoded and can simply replicate frames as needed.

Referring to FIG. 5, a first frame or frames may be fully encoded at the beginning, as indicated in block 102, in order to determine a base or reference. Then, a check at diamond 104 determines whether analytics assisted encoding should be provided. If analytics assisted encoding will not be used, the encoding proceeds as is done conventionally.

If analytics assisted encoding is provided, as determined in diamond 104, a threshold is determined, as indicated in block 106. The threshold may be fixed or may be adaptive, depending on non-motion factors such as the available battery power, the available bandwidth, or user selections, to mention a few examples. Next, in block 108, the existing frame and succeeding frames are analyzed to determine whether motion in excess of the threshold is present and, if so, whether it can be isolated to particular regions. To this end, the various analytics units may be utilized, including, but not limited to, the convolve unit, the erode/dilate unit, the subsample unit, and the lookup unit. Particularly, the image or frame may be analyzed for motion above a threshold, analyzed relative to previous and/or subsequent frames.

Then, as indicated in block 110, regions with motion in excess of a threshold may be located. Only those regions may be encoded, in one embodiment, as indicated in block 112. In some cases, no regions on a given frame may be encoded at all and this result may simply be recorded so that the frame can be simply replicated during decoding. In general, the encoder provides information in a header or other location about what frames were encoded and whether frames have only portions that are encoded. The address of the encoded portion may be provided in the form of an initial point and a matrix size in some embodiments.

FIGS. 3, 4, and 5 are flow charts which may be implemented in hardware. They may also be implemented in software or firmware, in which case they may be embodied on a non-transitory computer readable medium, such as an optical, magnetic, or semiconductor memory. The non-transitory medium stores instructions for execution by a processor. Examples of such a processor or controller may include the analytics engine 20 and suitable non-transitory media may include the main memory 28 and the external memory 22, as two examples.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a processor to identify a first portion of a first frame associated with an amount of motion above a motion threshold;
    an encoder to encode the first portion exclusively from a second portion of the first frame; and
    said encoder to reuse, in a subsequent frame, an encoded portion of a previous frame for a frame portion with motion below another motion threshold.

2. The apparatus of claim 1 wherein said first portion is a region of interest.

3. The apparatus of claim 2 wherein said region of interest is image data.

4. The apparatus of claim 3 wherein said region of interest is less than all of a frame.

5. The apparatus of claim 4 wherein said second portion of the frame is the rest of the first frame.

6. The apparatus of claim 1 wherein said previous frame is the frame before the subsequent frame.

7. The apparatus of claim 1 including a detection component to analyze frames to identify portions with motion above a threshold.

8. A system including a processor, an encoder and a memory storing instructions executed by the processor to:
    identify a first portion of a first frame associated with an amount of motion above a motion threshold;
    encode the first portion exclusively from the second portion of the first frame; and
    reuse, in a subsequent frame, an encoded portion of a previous frame for a frame portion with motion below another motion threshold.

9. The system of claim 8 wherein said first portion is a region of interest.

10. The system of claim 9 wherein said region of interest is image data.

11. The system of claim 10 wherein said region of interest is less than all of a frame.

12. The system of claim 11 wherein said second portion of the frame is the rest of the first frame.

13. The system of claim 8 wherein said previous frame is the frame before the subsequent frame.

14. The system of claim 8 including a detection component to analyze frames to identify portions with motion above a threshold.

15. An encoder comprising:
    a processing apparatus to identify a first portion of a first frame associated with an amount of motion above a motion threshold, to encode the first portion exclusively from a second portion of the first frame and to reuse, in a subsequent frame, an encoded portion of a previous frame for a frame portion with motion below another motion threshold; and
    a storage coupled to said processing apparatus.

16. The encoder of claim 15 wherein said first portion is a region of interest.

17. The encoder of claim 16 wherein said region of interest is image data.

18. The encoder of claim 17 wherein said region of interest is less than all of a frame.

19. The encoder of claim 18 wherein said second portion of the frame is the rest of the first frame.

20. The encoder of claim 15 wherein said previous frame is the frame before the subsequent frame.

21. The encoder of claim 15 including a detection component to analyze frames to identify portions with motion above a threshold.

22. A method comprising:
    identifying a first portion of a first frame associated with an amount of motion above a motion threshold;
    encoding the first portion exclusively from the second portion of the first frame; and
    reusing, in a subsequent frame, an encoded portion of a previous frame for a frame portion with motion below another motion threshold.

23. The method of claim 22 including performing a sequence wherein said first portion is a region of interest.

24. The method of claim 23 including storing instructions to perform a sequence wherein said region of interest is image data.

25. The method of claim 24 including storing instructions to perform a sequence wherein said region of interest is less than all of a frame.

26. The method of claim 25 including storing instructions to perform a sequence wherein said second portion of the frame is the rest of the first frame.

27. The method of claim 22 including storing instructions to perform a sequence wherein said previous frame is the frame before the subsequent frame.

28. The method of claim 22 including storing instructions to perform a sequence including a detection component to analyze frames to identify portions with motion above a threshold.

* * * * *